United States Patent
Wei

(10) Patent No.: US 7,694,051 B2
(45) Date of Patent: Apr. 6, 2010

(54) METHOD FOR CALCULATING MASTER/SLAVE RESPONSE TIME-OUT UNDER CONTINUOUS PACKET FORMAT COMMUNICATIONS PROTOCOL

(75) Inventor: Bo-Er Wei, Taipei (TW)

(73) Assignee: Moxa Technologies Co., Ltd., Shing Tien, Taipei Hsien (TW)

( * ) Notice: Subject to any disclaimer, the term of this patent is extended or adjusted under 35 U.S.C. 154(b) by 231 days.

(21) Appl. No.: 11/689,513

(22) Filed: Mar. 22, 2007

(65) Prior Publication Data

US 2008/0235420 A1 Sep. 25, 2008

(51) Int. Cl.
G06F 13/00 (2006.01)

(52) U.S. Cl. .................. 710/110; 710/118; 710/309

(58) Field of Classification Search ......... 710/104–125, 710/240–244, 306, 309; 709/208
See application file for complete search history.

(56) References Cited

U.S. PATENT DOCUMENTS

| | | | |
|---|---|---|---|
| 6,233,626 B1 * | 5/2001 | Swales et al. ................. | 710/11 |
| 6,496,890 B1 * | 12/2002 | Azevedo et al. ............. | 710/110 |
| 6,792,459 B2 * | 9/2004 | Elnozahy et al. ............ | 709/224 |
| 7,051,145 B2 * | 5/2006 | Butler et al. ................. | 710/305 |
| 7,330,921 B2 * | 2/2008 | Kawanishi ................... | 710/106 |
| 7,353,314 B2 * | 4/2008 | Suzuki et al. ............... | 710/306 |
| 2008/0235346 A1 * | 9/2008 | Wei ............................ | 709/211 |

OTHER PUBLICATIONS

Modicon, Jun. 1996, Modicon Inc., Industrial Automation Systems, Modicon Inc., Rev. J, MODBUS Protocol Reference Guide, pp. 6-7, 22, 74, 76.*
modbus.org, Dec. 28, 2006, Modbus-IDA, V1.1b, MODBUS Application Protocol Specification, Fig 2, section 2-3 and 6,8.*

* cited by examiner

*Primary Examiner*—Raymond N Phan
(74) *Attorney, Agent, or Firm*—Bacon & Thomas, PLLC

(57) ABSTRACT

A method of detecting master/slave response time-out under continuous packet format communications protocol, which calculates the time required for the slave device to respond to a Modbus request subject to Modbus TCP/UDP protocol. The method is to continuously send Modbus requests to a slave device through a detection device and to record each Modbus request sent time, and to have the slave device provide to the detection device a response for each Modbus request. By means of calculating the precise response time-out from the response time-outs which are gotten from the slave device responds to a predetermined number of Modbus requests, the user or manager can determine the response time-out required for the slave device precisely so as to give an EXECUTE instruction or command at the accurate time point.

14 Claims, 7 Drawing Sheets

| Modbus Application Protocol Header | Function code | Data |
|---|---|---|
| 7 bytes | 1 byte | 0~252 bytes |

*FIG. 5*

METHOD FOR CALCULATING MASTER/SLAVE RESPONSE TIME-OUT UNDER CONTINUOUS PACKET FORMAT COMMUNICATIONS PROTOCOL

BACKGROUND OF THE INVENTION

1. Field of the Invention

The present invention relates to a method of detecting master/slave response time-out under continuous packet format communications protocol. By means of calculating the precise response time-out from response time-outs which are gotten from the slave device responds to a predetermined number of Modbus requests and applying the precise response time-out to the formal master/slave communication time period, the master device can give an EXECUTE instruction or command at the accurate time point.

2. Description of the Related Art

Following fast development of communication technology, communication networks have also been well developed. LAN (Local Area Network) and WAN (Wide Area Network) are categorized subject to their scope and scale. A LAN connects network devices over a relatively short distance. A WAN is a geographically-dispersed collection of LANs. The Internet is the largest WAN, spanning the Earth. Either in LAN or WAN, Ethernet has proven itself as a relatively inexpensive, reasonably fast, and very popular LAN technology. Ethernet cables (fiber optics or twisted pair) are limited in their reach, and these distances are insufficient to cover medium-sized and large network installations. Therefore, repeaters are used in Ethernets. A repeater in Ethernet networking is a device that allows multiple cables to be joined and greater distances to be spanned. A bridge device can join an Ethernet to another network of a different type, such as a wireless network. Popular types of repeater devices are Ethernet hubs, switches and routers. By means of the combination of Ethernet cables with hubs, switches and/or routers, an Ethernet networking allows transmission or control of data or instructions among different LANs, computers, and/or other devices such as surveillance systems, security systems, automation systems, etc.

Further, there is known a network communication architecture commonly seen in industrial control and device communication protocol or rules, i.e., Modbus. Modbus is a serial communications protocol published by Modicon in 1979 for use with its programmable logic controllers (PLCs). It has become a standard communications protocol in industry, and is now the most commonly available means of connecting industrial electronic devices. The first main reason for the extensive use of Modbus over other communications protocols is that Modbus is openly published and royalty-free. The second main reason is that Modbus can be implemented in days, not months. Modbus moving raw bits or words without placing many restrictions on vendors is the third main reason.

However, because Modbus is a master/slave protocol, the master device must poll the slave devices one by one but cannot bi-directionally communication with all the slave devices at a same time. Further, every slave device connected to the master device has a unique address for allowing accurate communication with the master device. Either the other slave devices have received the instruction or request from the master device or have not received any instructions or requests, only the slave device to be in communication with the master device will process the instruction or request given by the master device.

Because Modbus is a master/slave protocol and because the master device must poll the slave devices one by one, it is important to know accurately the response time-out when the master device gives a request to the slave device. Currently slave response time-out is measured by the user's rule of experience, or trial and error. However, this nonprecise verification method tends to obtain an inaccurate response time-out. Further, manual verification is time consuming and costly. Setting of improper response time-out may cause the system unable to function. For example, in a regular industrial manufacturing line (such as wafer plant, plastic materials plant), if the slave device cannot give the instruction on accurate time due to that the response time-out required for the slave device is not accurately obtained, or if the slave device cannot execute the master device's command at accurate time point, an abnormality or interruption of the manufacturing line may occur, resulting in paralysis or damage of the machinery of the industrial manufacturing line. Further, the temperature control, emergency exit system and other control actions in a building control need to make an accurate response at accurate time point. If responding tactics cannot be started at accurate time point, it will get no help in reducing the risk of disaster and the loss resulted from such disaster.

Therefore, it is desirable to provide a method of detecting master/slave response time-out under continuous packet format communications protocol that eliminates the aforesaid problem.

SUMMARY OF THE INVENTION

The present invention has been accomplished under the circumstances in view. It is the main object of the present invention to provide a method of detecting master/slave response time-out under continuous packet format communications protocol, which enables the main control center or manager to start the related emergency measures, for example, to start the auto control system of a building at the accurate time point. By means of calculate the accurate response time-out of the slave device, the main control center or manager can give the request to start the related emergency measures at an accurate time, thereby lowering the chance of disaster and the loss from any disaster, and also helping evacuation of people from a disaster. By means of calculating the accurate master/slave response time-out, the present invention eliminates the risk of inaccurate response time-out obtained subject to the user's rule of experience or by means of trial and error.

It is another object of the present invention to provide a method of detecting master/slave response time-out under continuous packet format communications protocol, which uses different functions: such as using functions of maximum, minimum or average on slave device response time-outs and further may plus a time delay, enabling the user to make an accurate setting for a specific industry or technical field, therefore the invention eliminates the risk of inaccurate response time-out obtained subject to the user's rule of experience or by means of trial and error.

It is still another object of the present invention to provide a method of detecting master/slave response time-out under continuous packet format communications protocol, which calculates the time required for the slave device to respond to a Modbus request subject to Modbus TCP/UDP protocol. The method of the present invention is compliant to Modbus TCP/UDP communications protocol. The invention can obtain the precise response time-out without extra hardware devices or elements after installation or setting of a software.

BRIEF DESCRIPTION OF THE DRAWINGS

FIG. 5 illustrates a Modbus TCP/UDP protocol standard packet format according to the present invention.

DETAILED DESCRIPTION OF THE PREFERRED EMBODIMENT

From the aforesaid prior art technique, we know that Modbus is a master/slave communication protocol. In one same network, Modbus allows for connection of different slave devices to one master device. Further, Modbus includes two standards for internet and intranet. The first standard is Modbus TCP (Transmission Control Protocol) standard that uses a RTU (Remote Terminal Unit) for message passing in Intranet or Internet. The second standard is Modbus UDP (User Datagram Protocol) that transmits data in the form of a package format. The Modbus TCP standard and the Modbus UDP standard both have the common features of continuous packet data transmission and allowing for transmission of different requests in proper order from the master device to the slave device at one same time point. Further details about Modbus TCP/UDP standards will be described further.

Figure 1:
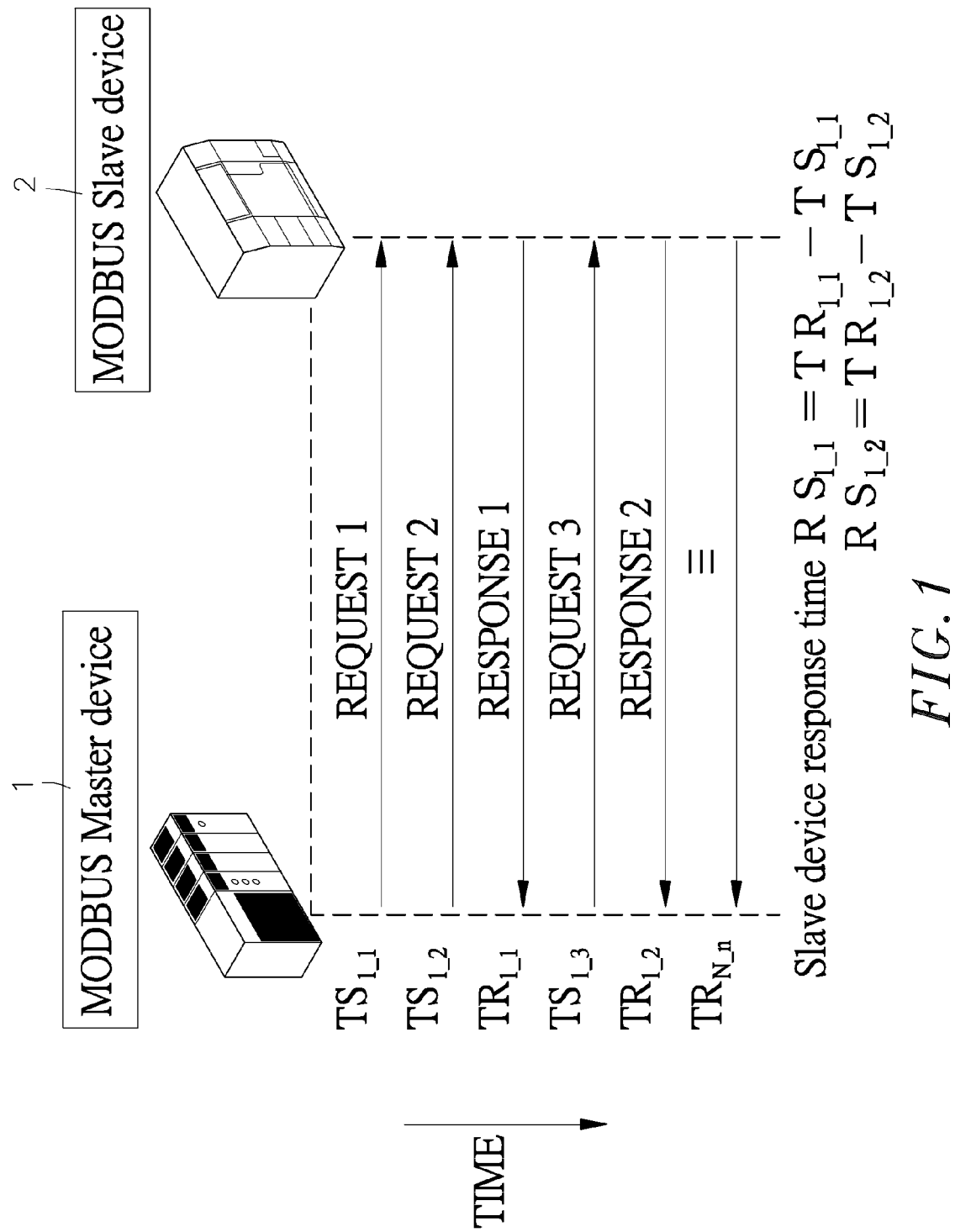
FIG. 1 is a schematic drawing illustrating response time under the Modbus TCP/UDP communication protocol architecture according to the preferred embodiment of the present invention.
Figure 2:
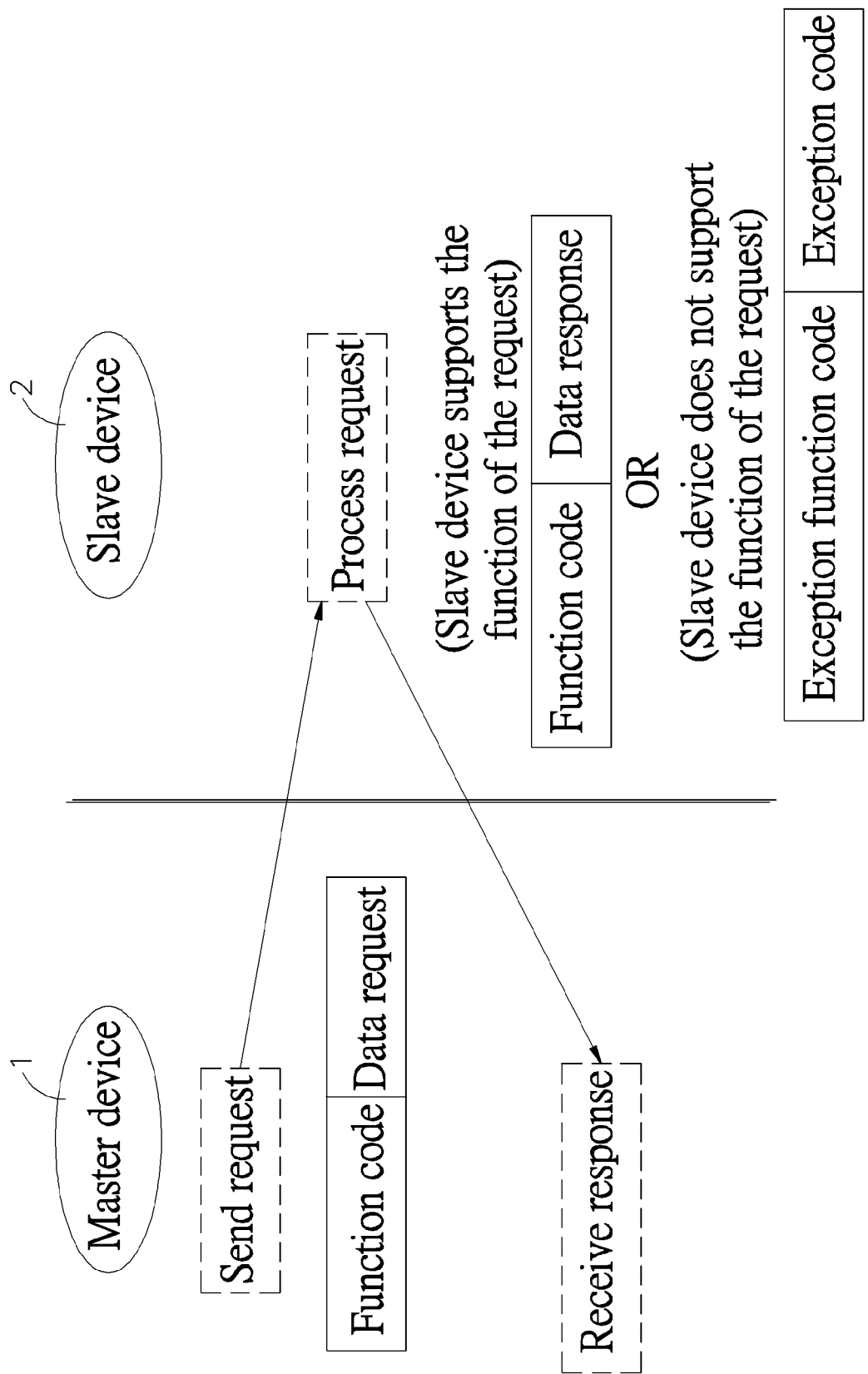
FIG. 2 is a schematic drawing illustrating a communication under the Modbus TCP/UDP communication protocol architecture according to the preferred embodiment of the present invention.

FIG. 1 is a schematic drawing illustrating response time under the Modbus TCP/UDP communication protocol architecture according to the preferred embodiment of the present invention. FIG. 2 is a schematic drawing illustrating a communication under the Modbus TCP/UDP communication protocol architecture according to the preferred embodiment of the present invention. As illustrated, a slave device 2 is connected to a master device 1 under the Modbus TCP/UDP communication protocol architecture. The master-slave interaction allows the master device 1 to continuously send requests to the slave device 2. These requests include Function code and Data request. If the slave device 2 supports the function of the requests, the slave device 2 gives responses including Function code and Data response to the master device 1 after receiving and executing the request. On the contrary, if the slave device 2 does not supports the function of the request, the slave device 2 gives responses including Exception function code and Exception code to the master device 1 after receiving the request.

Figure 3:
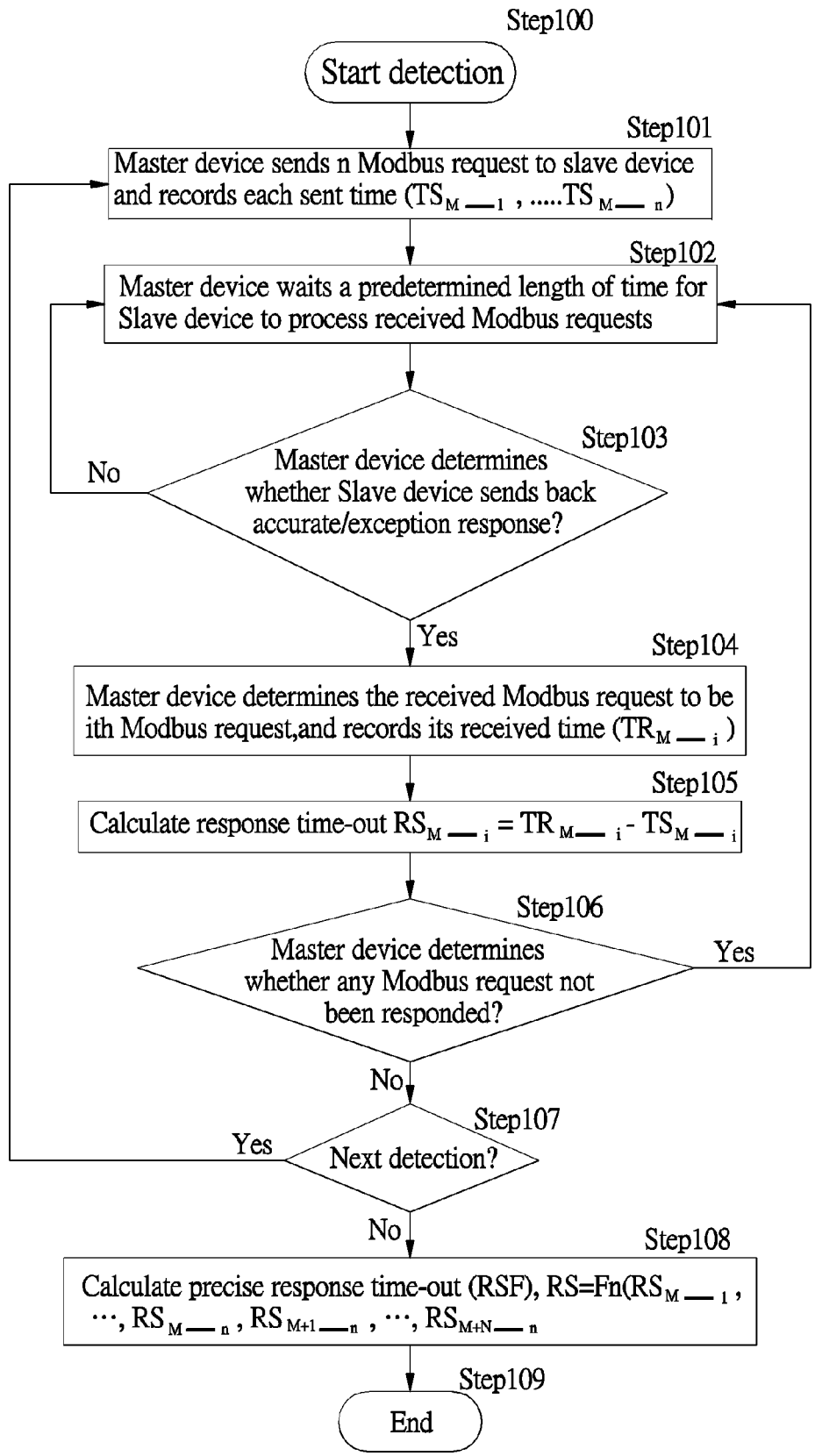
FIG. 3 is the flowchart of precise response time-out detection under Modbus TCP/UDP communication protocol architecture according to the preferred embodiment of the present invention.

FIG. 3 is the flowchart of precise response time-out detection under Modbus TCP/UDP communication protocol architecture according to the preferred embodiment of the present invention. Referring to FIG. 3 and FIGS. 1 and 2 again, the response time-out detection under Modbus TCP/UDP communication protocol includes the steps of:

(100) Start detection;
(101) Master device 1 sends n MODBUS requests to Slave device 2, and records the respective request sent times $(TS_{M\_1}, \ldots TS_{M\_n})$;
(102) Master device 1 waits a predetermined length of time for enabling Slave device 2 to handle Modbus requests sent by Master device 1;
(103) Master device 1 determines whether or not Slave device 2 sends back an accurate/exception response, and then proceeds to step (104) if yes, or returns to step (102) if not;
(104) Master device 1 determines the response to be corresponding to $i_{th}$ MODBIS request, and records its received time $(TR_{M\_i})$;
(105) Calculate each response time-out: $RS_M\_i = TR_M\_i - TS_M\_i$;
(106) Master device 1 determines if there is any Modbus request has not been responded, and then proceeds to step (107) if all requests have been responded, or returns to step (102) if there is any request has not been responded;
(107) Determine whether or not to run a next detection, and then proceeds to step (108) if not, or returns to step (101) if yes;
(108) Calculate precise response time-out $(RS_F)$, $RS_F = Fn(RS_{M\_1}, \ldots, RS_{M\_n}, \ldots RS_{M+1\_1}, \ldots, RS_{M+N\_n})$;
(109) End the detection.

Figure 4:
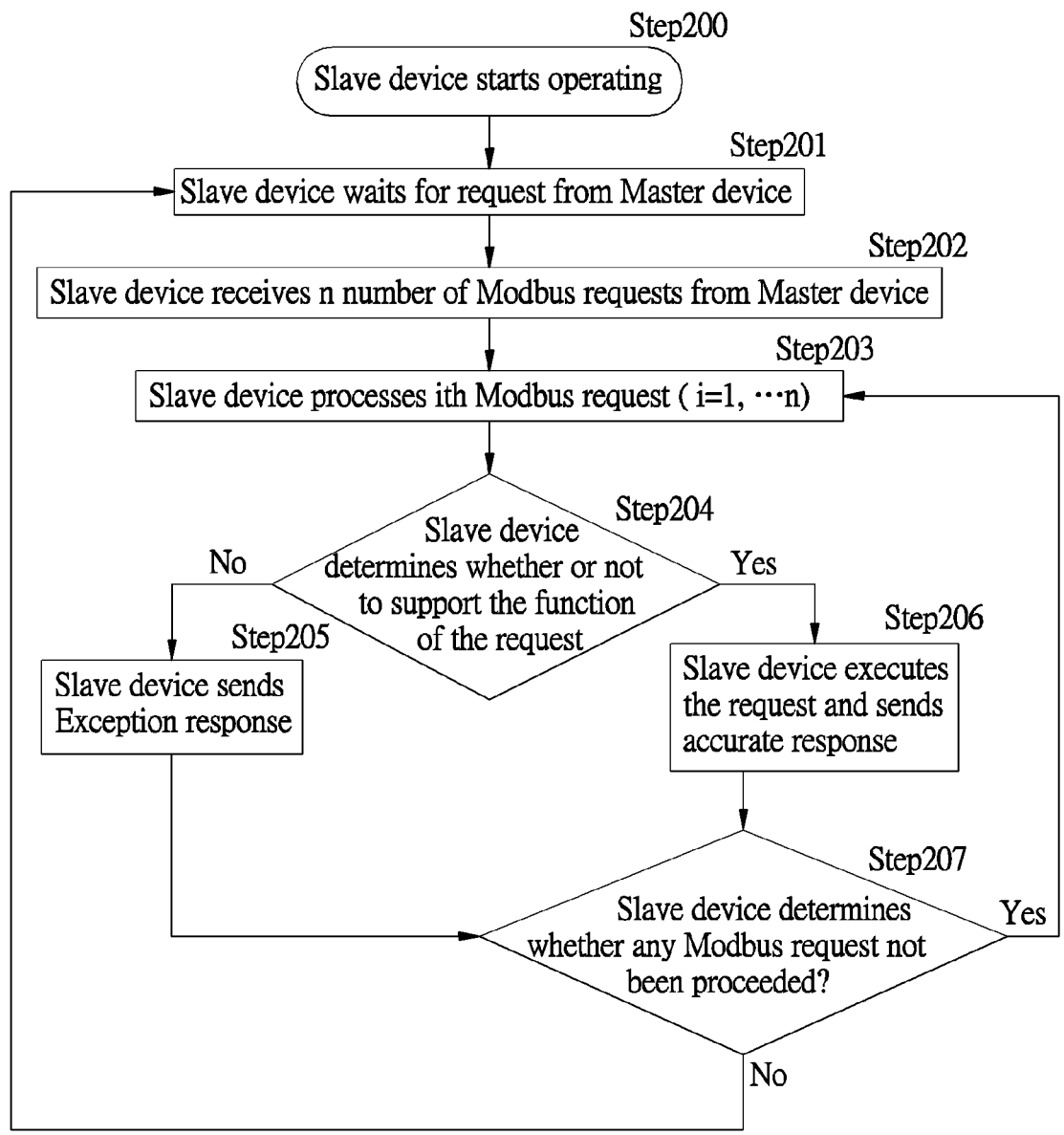
FIG. 4 is the slave device response flow of precise response time-out detection under Modbus TCP/UDP communication protocol architecture according to the preferred embodiment of the present invention.

FIG. 4 is the slave device response flow of precise response time-out detection under Modbus TCP/UDP communication protocol architecture according to the preferred embodiment of the present invention. The slave device 2 responds to the requests sent by the master device 1 subject to the steps of:

(200) Slave device 2 starts operating;
(201) Slave device 2 waits for requests from Master device 1;
(202) Slave device 2 receives n Modbus requests from Master device;
(203) Slave device 2 handles $i_{th}$ Modbus request (i=1, ..., n);
(204) Slave device 2 determines whether or not to support the function of this request, and then proceeds to step (205) if not, or step (206) if yes;
(205) Slave device 2 sends Exception response and then proceeds to step (207);
(206) Slave device 2 executes the request and sends the accurate result response;
(207) Slave device 2 makes sure if there is any Modbus request suspending, and then returns to step (203) if yes, or returns to step (201) if not.

In a word, the invention is, at first, to have the master device 1 send n Modbus requests to the slave device 2 to be detected and record each request sent time $(TS_{M\_1}, \ldots TS_{M\_n})$, and then to have the slave device 2 handle $i_{th}$ Modbus request. Thereafter, the master device 1 receives responses from the slave device 2 and records each response received time $(TR_{M\_i})$, and then calculates each response time-out: $RS_M\_i = TR_M\_i - TS_M\_i$. Thereafter, repeat the aforesaid steps n times to obtain every response received time $(TR_M\_i)$ and to calculate every response time-out $RS_{M\_i}$, so as to obtain $RS_{M\_1}, \ldots, RS_{M\_n}$. Thereafter, repeat all the aforesaid steps N−1 times, so as to obtain $(RS_{M+1\_1}, \ldots, RS_{M+1\_n})$, $(RS_{M+2\_1}, \ldots, RS_{M+2\_n}), \ldots, (RS_{M+N\_1}, \ldots, RS_{M+N\_n})$. At final, $RS_{M\_1}, \ldots, RS_{M\_n}, RS_{M+1\_1}, \ldots, RS_{M+N\_n}$ thus obtained are put in a predetermined function $Fn(RS_{M\_1}, \ldots, RS_{M\_n}, RS_{M+1\_1}, \ldots, RS_{M+n\_n})$ for calculation to obtain the desired precise response time-out $RS_F$. In actual practice, the function used in the method of detecting master/slave response time-out under continuous packet format communications protocol can be calculated subject to the average response time-out plus a time delay, and therefore the function Fn( ) can be:

$$RS_F = Fn(RS_{M\_1}, \ldots, RS_{M\_n}, RS_{M+1\_1}, \ldots, RS_{M+N\_n})$$
$$= \sum_{M=1}^{N} \sum_{i=1}^{n} RS_{M\_i} / (N \times n) + T_{OFFSET}$$

Further, the function used in the method of detecting master/slave response time-out under continuous packet format communications protocol can be calculated subject to the maximum response time-out plus a time delay, and therefore the function Fn( ) can be:

$$RS_F = Fn(RS_{M\_1}, \ldots, RS_{M\_n}, RS_{M+1\_1}, \ldots, RS_{M+N\_n})$$
$$= MAX((RS_{M\_1}, \ldots, RS_{M\_n}, RS_{M+1\_1}, \ldots, RS_{M+N\_n}) + T_{OFFSET}.$$

The aforesaid Modbus requests are requests in Modbus TCP/UDP protocol standard packet format. This packet format, as shown in FIG. 5, comprises 7 bytes Modbus Application Protocol Header, 1 byte Function Code, and 0~252 bytes Data. Further, N and n used in the aforesaid equations can be any positive integer, and the value of n in each detection can be same or different.

Basically, Modbus TCP architecture adopts binary coding for data transmission. Because Modbus TCP is a connection-oriented protocol, Modbus TCP protocol provides a stable one-to-one master-slave protocol or stable one-to-multiple client-server protocol. However, Modbus UDP standard is similar to Modbus TCP standard. It has the same message format with Modbus TOP standard and allows for data transmission among networks by means of packet format. The only difference between Modbus UDP and Modbus TCP is that Modbus UDP requires less overhead than Modbus TCP and thus is faster. Modbus UDP is ideal for local networks where you want real-time performance. Both Modbus TOP and Modbus UDP allow for sending Modbus messages over Ethernet using TCP/IP packeting. Further, the method of detecting master/slave response time-out does not limit the Modbus TCP/UDP contained function code and data. To prevent interference with the operation of the slave device in actual practice, the Modbus request can be return query data (function code 0x08, sub-function code 0x0000), read coils (function code 0x01), read discrete inputs (function code 0x02), read holding register (function code 0x03), read input register (function code 0x04), or any function code set by the user.

Figure 6:
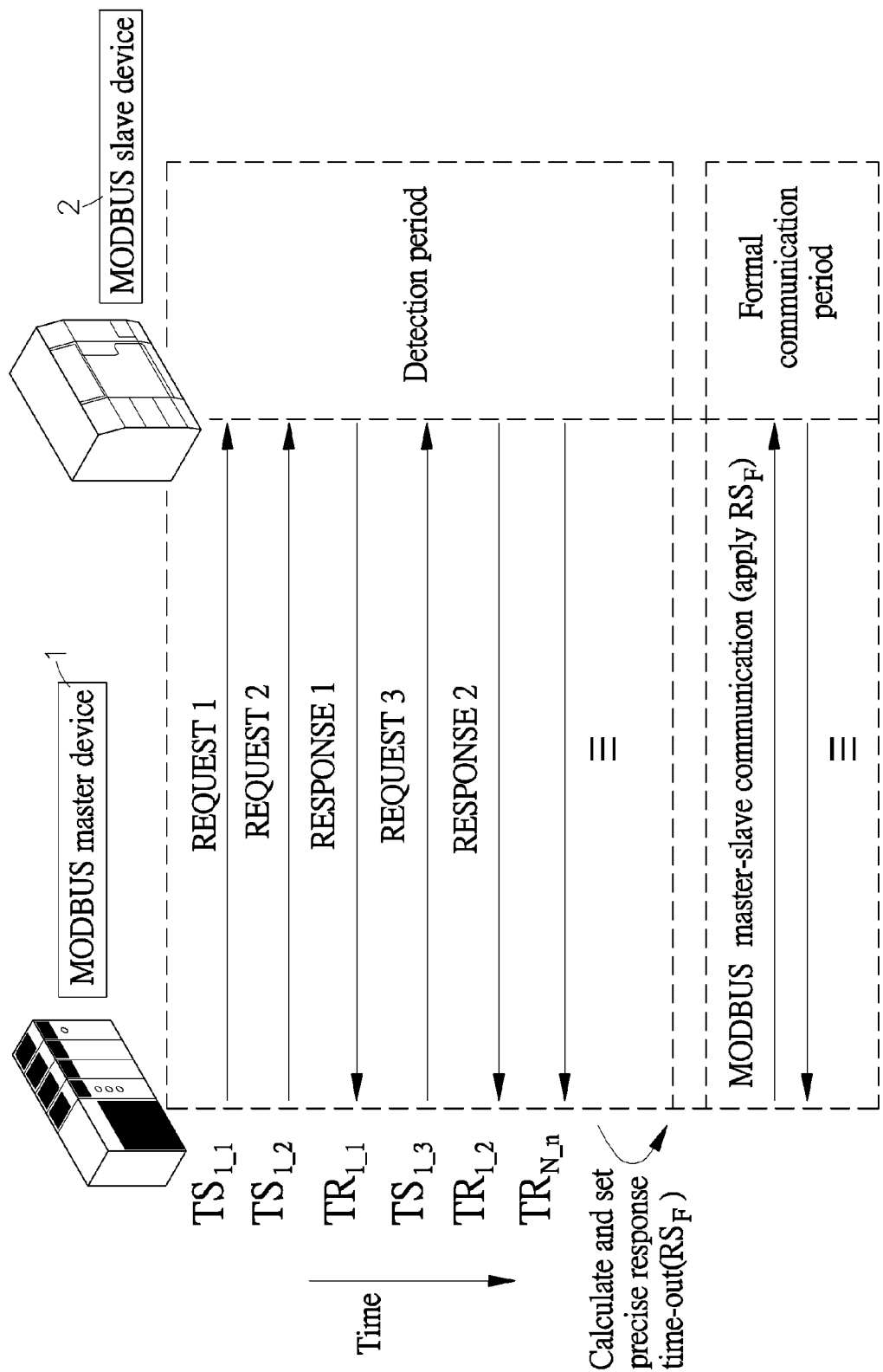
FIG. 6 is a schematic drawing illustrating an application of detection of slave device response time-out to a Modbus master device according to the present invention.

FIG. 6 is a schematic drawing illustrating an application of the detection of a slave device response time-out to a Modbus master device according to the present invention. Subject to the aforesaid technical content and method of the present invention, the master device 1 can use the precise response time-out $RS_F$ obtained during the detection time period in the formal communication time period, i.e., the time period in which the master device 1 and the slave device 2 are started to transmit data or request. During this formal communication time period, the master device 1 can use the precise response time-out $RS_F$ to determine at which time point to obtain the response time-out from the slave device 2. Thus, the master device 1 needs not to obtain a raw response time-out by means of conventional rule of experience, or trial and error.

Figure 7:
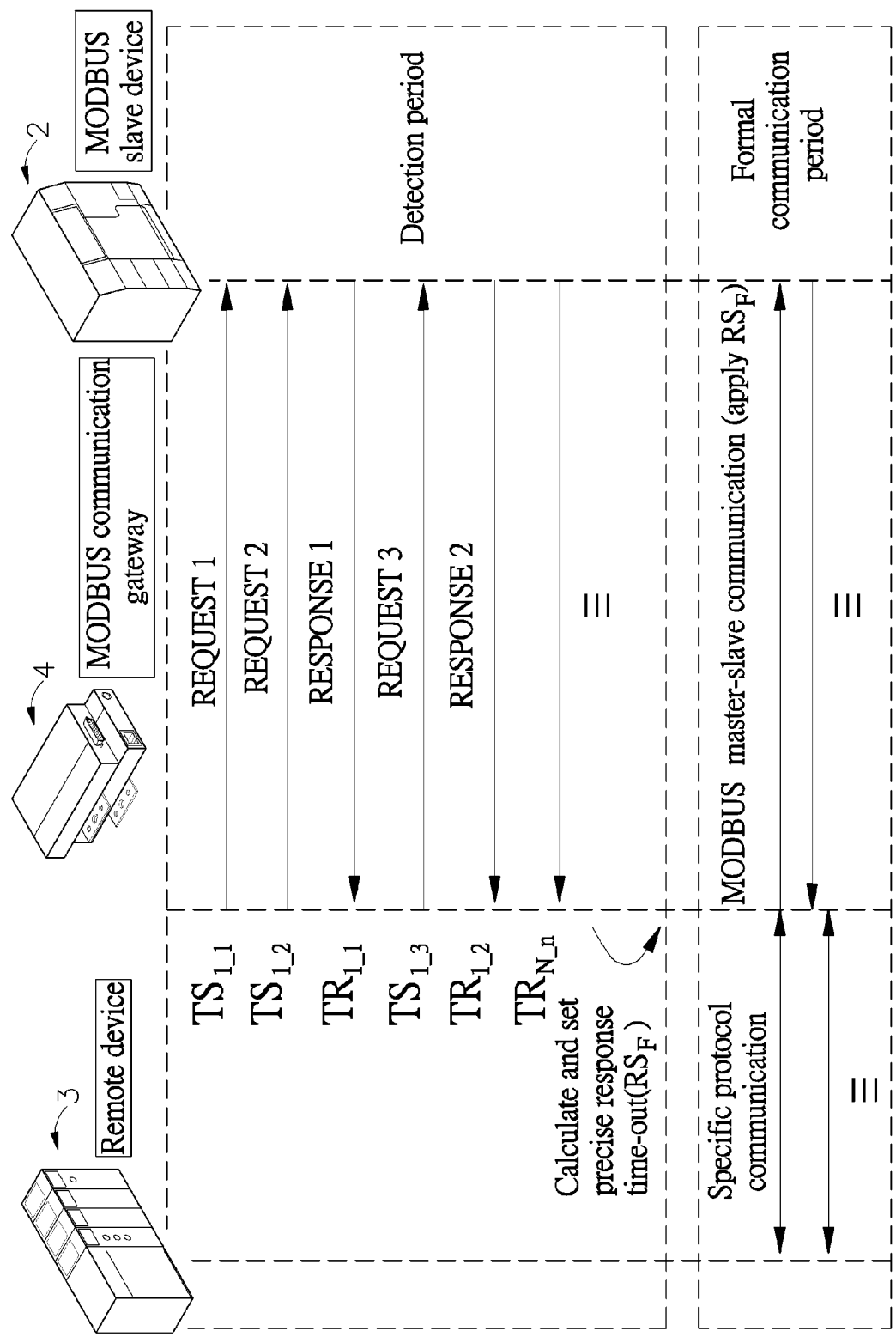
FIG. 7 is a schematic drawing illustrating an application of detection of slave device response time-out to a Modbus communication gateway according to the present invention.

FIG. 7 is a schematic drawing illustrating an application of detection of slave device response time-out to a Modbus communication gateway according to the present invention. As illustrated, a slave device 2 and a remote device 3 are respectively connected to a Modbus communication gateway 4. After the precise response-time out of the Modbus communication gateway 4 and the slave device 2 has been obtained subject to the aforesaid method and set the precise response time-out $RS_F$ on the Modbus communication gateway 4, this precise response time-out $RS_F$ can be applied to the formal communication among the remote device 3, the Modbus communication gateway 4 and the slave device 2. During interaction among the remote device 3, the Modbus communication gateway 4 and the slave device 2, the Modbus communication gateway 4 can use the precise response time-out $RS_F$ to determine at which time point to obtain the response from the slave device 2 or to act with the remote device 3.

The above description is simply an example of the present invention. During actual practice, the master device can be a Modbus communication gateway, detection device, repeater, or any of a variety of other electronic devices capable of sending a test request. Further, the request sent by the master device 1 can be: read holding register, return query data, or the like. Further, the operating function used in the aforesaid description can be the calculation of the average time, maximum time, shortest time, or any of the times plus a time delay.

Therefore, when compared to the prior art techniques, the present invention shows the following advantages:

1. In regular building automation applications, proximal/remote or master/slave concept is adopted. All events management and emergency handlings are connected to the computer in the main control room through a transmission interface. When a condition happens, a person in the main control room or the computer issues a request to an external input/output device to execute a specific action, for example, turning on the radiation fan when the temperature is excessively high, turning on the alarm lamp when the exist door is abnormally opened, starting the automatic sprinkling system when the temperature surpasses a predetermined fire temperature, etc. Because the trigging time of these actions is critical, the main control terminal or the manager must give the necessary request to start the related control means at the accurate triggering time. By means of calculating the accurate slave device response time-out, the main control terminal or manager can give the request to the slave device at the accurate time point, i.e., the invention prevents the master device from sending out a triggering request to trigger the related facility early or at a late time, thereby lowering the chance of disaster and the loss from any disaster, and effectively helping evacuation of people from a disaster. Therefore, the invention eliminates the risk of inaccurate response time-out obtained subject to the user's rule of experience or by means of trial and error.

2. Conventionally, Modbus slave device response time-out is obtained subject to the user's rule of experience or by means of trial and error. The Modbus slave device response time-out obtained subject to the user's rule of experience or by means of trial and error is not precise. Setting inaccurate response time-out may result in a system operation obstruction. In an industrial manufacturing line (for example, a wafer plant or plastic materials plant), if the master device cannot transmit a control request to the slave device or the slave device cannot execute the request from the master device at the accurate time point, the manufacturing line may be interrupted or an abnormal condition may occur in the manufacturing line, thereby resulting in paralysis or damage of the machinery of the industrial manufacturing line. Therefore, by means of calculating the precise master/slave response time-out ($RS_F$) and using it in the formal system communication time period, the master device can determine the triggering time point accurately, preventing a delay of trigging time.

3. The invention uses different functional functions, such as using functions of maximum, minimum or average on slave device response time-outs and further may plus a time delay, for enabling the user to make an accurate setting for a specific industry or technical field, and therefore the invention eliminates the risk of inaccurate response time-out obtained subject to the user's rule of experience or by means of trial and error.

4. Following alternation of generations, Modbus protocol has become a communication standard in industry. Modbus protocol architecture devices have been intensively used for connection between industrial electronic devices. The method of the present invention is compliant to Modbus communications protocol. The invention can obtain the precise response time-out without extra hardware devices or elements after installation or setting of a software.

5. The invention directly uses the requests under Modbus protocol standards and needs not to define other proprietary requests. Therefore, the requests used do not affect the normal functioning of the slave device. Further, either using the Modbus master device or Modbus communication gateway to transmit external requests, the slave response time-out can be measured through a software. Therefore, the user needs not to set the slave device response time-out manually, preventing a system operation problem due to inaccurate response time-out that may affect the client's confidence in the reliability of the product, causing the client to reject the product.

Although a particular embodiment of the invention has been described in detail for purposes of illustration, various modifications and enhancements may be made without departing from the spirit and scope of the invention.

What the invention claimed is:

1. A method of detecting master/slave response time-out under continuous packet format communications protocol, which calculates the time required for a detection device functioning as a Modbus master to receive a response from a slave device in response to a Modbus request sent by the detection device subject to Modbus TCP/UDP protocol, the method comprising the steps of:
    (a) a detection device sends continuously at least one Modbus request to a slave device at a same time and records requests sent time;
    (b) the slave device receives the at least one Modbus request and send back a response to each Modbus request;
    (c) the detection device receives every response individually from the slave device and records its received time;
    (d) the detection device calculates the response time-out of the slave device for each of the at least one Modbus request from the detection device; and
    (e) the detection device calculates the precise response time-out from a predetermined number of response time-outs which are gotten from said slave device responses to said Modbus requests.

2. The method as claimed in claim 1, wherein said response time-out is the response time-out subject to Modbus protocol standard.

3. The method as claimed in claim 1, wherein the calculation of the precise responding time is done by obtaining one of the average time, maximum time or shortest time of the response time-outs by means of a function.

4. The method as claimed in claim 1, wherein the calculation of said response time-out is done by means of the equation of $RS_{M\_i}=TR_{M\_i}-TS_{M\_i}$, in which $RS_{M\_i}$ is the respond time-out; $TR_{M\_i}$ is the time point where the detection device receives a respond from the slave device; $TS_{M\_i}$ is the time point where the detection device sends a request to the slave device.

5. The method as claimed in claim 1, wherein said slave device sends a response of exception to said detecting device when said slave device does not support the at least one Modbus function of the request of said detection device.

6. The method as claimed in claim 1, wherein each response produced by said slave device corresponding to each Modbus request is one of accurate response and exception.

7. The method as claimed in claim 1, wherein the at least one Modbus request sent by said detection device to said slave device includes at least one of return query data (function code 0x08, sub-function code 0x0000), read coils (function code 0x01), read discrete inputs (function code 0x02), read holding register (function code 0x03), read input register (function code 0x04), and function code set by the user.

8. The method as claimed in claim 1, wherein said precise response time-out is applicable to the communication period between said master device and said slave device.

9. The method as claimed in claim 1, wherein said precise response time-out is applicable to the formal communication time period among a communication gateway, said slave device, and a remote device.

10. The method as claimed in claim 1, wherein said detecting device includes one of Modbus master device or Modbus communication gateway.

11. The method as claimed in claim 1, wherein said continuous packet format communications protocol is one of Modbus TCP and Modbus UDP.

12. The method as claimed in claim 3, wherein the calculation of said precise response time-out includes the step of adding a time delay.

13. The method as claimed in claim 3, wherein obtaining the average time for the precise response time-out is done by means of a calculation through the equation of:

$$RS_F = Fn(RS_{M\_1}, \ldots, RS_{M\_n}, RS_{M+1\_1}, \ldots, RS_{M+n\_n})$$
$$= \sum_{M=1}^{N} \sum_{i=1}^{n} RS_{M\_i} / (N \times n) + T_{OFFSET},$$

in which: $RS_F$ is the precise response time-out of the slave device; Fn ( ) is a function; $RS_{M\_1}, \ldots, RS_{M\_n}$, $RS_{M+1\_1}, \ldots, RS_{M+n\_n}$ are response time-out during the period; $T_{OFFSET}$ is the delay.

14. The method as claimed in claim 3, wherein obtaining the maximum time for the precise response time-out is done by means of a calculation through the equation of:
    $RS_F$=Fn ($RS_{M\_1}, \ldots, RS_{M\_n}, RS_{M+1\_1}, \ldots, RS_{M+N\_n}$)= MAX($RS_{M\_1}, \ldots, RS_{M\_n}, RS_{M+1\_1}, \ldots, RS_{M+N\_n}$)+ $T_{OFFSET}$, in which: $RS_F$ is the precise response time-out of the slave device; Fn ( ) is a function; $RS_{M\_1}, \ldots, RS_{M\_n}, RS_{M+1\_1}, \ldots, RS_{M+N\_n}$ are response time-out during the period; $T_{OFFSET}$ is the delay.

* * * * *